(12) United States Patent
Irgang et al.

(10) Patent No.: US 10,330,845 B2
(45) Date of Patent: Jun. 25, 2019

(54) WAVEGUIDE FOR CONTROLLED LIGHT DISTRIBUTION

(71) Applicant: Rebo Lighting & Electronics, LLC, Ann Arbor, MI (US)

(72) Inventors: Todd Irgang, Saline, MI (US); Stephen Kowalchik, Dexter, MI (US); John Dominick, Ann Arbor, MI (US)

(73) Assignee: REBO LIGHTING & ELECTRONICS, LLC, Ann Arbor, MI (US)

( * ) Notice: Subject to any disclaimer, the term of this patent is extended or adjusted under 35 U.S.C. 154(b) by 0 days.

(21) Appl. No.: 14/495,867

(22) Filed: Sep. 24, 2014

(65) Prior Publication Data

US 2016/0085017 A1 Mar. 24, 2016

(51) Int. Cl.
| | |
|---|---|
| G02B 6/00 | (2006.01) |
| F21V 8/00 | (2006.01) |
| B60Q 1/28 | (2006.01) |
| B60Q 1/00 | (2006.01) |
| B60Q 1/26 | (2006.01) |

(52) U.S. Cl.
CPC ......... *G02B 6/0036* (2013.01); *B60Q 1/0035* (2013.01); *B60Q 1/2665* (2013.01); *B60Q 1/28* (2013.01); *G02B 6/006* (2013.01); *G02B 6/0065* (2013.01); *G02B 6/0073* (2013.01)

(58) Field of Classification Search
CPC .. G02B 6/0036; G02B 6/0038; G02B 6/0065; G02B 6/0073; B60Q 1/0011; B60Q 1/0035
See application file for complete search history.

(56) References Cited

U.S. PATENT DOCUMENTS

| | | | |
|---|---|---|---|
| 5,432,876 A | * | 7/1995 | Appeldorn ............. G02B 6/001 362/554 |
| 5,664,862 A | | 9/1997 | Redmond et al. |
| 6,021,007 A | | 2/2000 | Murtha |
| 6,095,673 A | | 8/2000 | Goto et al. |
| 6,152,569 A | | 11/2000 | Aizawa |
| 6,259,854 B1 | | 7/2001 | Shinji et al. |
| 6,667,782 B1 | | 12/2003 | Taira et al. |
| 6,867,828 B2 | | 3/2005 | Taira et al. |
| 7,437,050 B2 | | 10/2008 | Bourdin et al. |
| 8,029,175 B2 | | 10/2011 | Koizumi |
| 8,328,403 B1 | | 12/2012 | Morgan et al. |

(Continued)

FOREIGN PATENT DOCUMENTS

| | | |
|---|---|---|
| CN | 101715563 A | 5/2010 |
| WO | WO2010090992 | 8/2010 |

OTHER PUBLICATIONS

International Search Report corresponding to International application No. PCT/US2015/051925, dated Jan. 6, 2016, 5 pages.

(Continued)

*Primary Examiner* — Gerald J Sufleta, II
(74) *Attorney, Agent, or Firm* — Reising Ethington, P.C.

(57) ABSTRACT

A waveguide for controlled light distribution is described. The waveguide may include a body that longitudinally extends from a proximate end to a distal end. And the body may include a plurality of scattering flanges axially extending toward the proximate end on a first longitudinal side and a plurality of notches interposed between each of the plurality of scattering flanges.

10 Claims, 5 Drawing Sheets

(56) References Cited

U.S. PATENT DOCUMENTS

| | | | |
|---|---|---|---|
| 8,449,161 B2 | 5/2013 | Igoe et al. | |
| 8,467,013 B2 | 6/2013 | Gourlay | |
| 8,657,479 B2 | 2/2014 | Morgan et al. | |
| 2001/0019479 A1 | 9/2001 | Nakabayashi et al. | |
| 2001/0019487 A1* | 9/2001 | Honguh | G02B 6/0038 362/551 |
| 2003/0137617 A1 | 7/2003 | Cornelissen et al. | |
| 2005/0210643 A1 | 9/2005 | Mezei et al. | |
| 2006/0245718 A1 | 11/2006 | Winston et al. | |
| 2007/0248307 A1 | 10/2007 | Page et al. | |
| 2008/0310187 A1* | 12/2008 | Huang | F21S 48/215 362/615 |
| 2009/0128735 A1* | 5/2009 | Larson | G02B 6/0018 349/62 |
| 2010/0157619 A1* | 6/2010 | Chinniah | G02B 6/001 362/551 |
| 2010/0202153 A1* | 8/2010 | Schwab | B60Q 1/0041 362/520 |
| 2012/0019942 A1* | 1/2012 | Morgan | F21S 11/00 359/853 |
| 2012/0162281 A1* | 6/2012 | Cho | G02B 6/0036 345/690 |
| 2014/0023319 A1* | 1/2014 | Mizuyama | B29D 11/00721 385/37 |
| 2014/0063839 A1* | 3/2014 | Guy | G02B 6/0005 362/558 |
| 2014/0140091 A1* | 5/2014 | Vasylyev | G02B 6/001 362/606 |

OTHER PUBLICATIONS

Written Opinion corresponding to International application No. PCT/US2015/051925, dated Jan. 6, 2016, 5 pages.

Extended European Search report issued by the European Patent Office for application No. 15845009.8.

Office action issued by the China National Intellectual Property Administration (CNIPA) for application 201580051772.0 dated Jan. 29, 2019.

Translation of the Office action issued by the China National Intellectual Property Administration (CNIPA) for application 201580051772.0.

\* cited by examiner

WAVEGUIDE FOR CONTROLLED LIGHT DISTRIBUTION

TECHNICAL FIELD

This disclosure generally relates to a waveguide configured for controlled light distribution.

BACKGROUND

Light pipes may be used in a variety of vehicle applications including illuminating regions inside a vehicle, outside of the vehicle, or both. For example, some light pipe applications may be functional or utility-based, and other light pipe applications may be for accent-lighting or have aesthetic qualities.

SUMMARY

According to an embodiment of the disclosure, there is provided a waveguide for controlled light distribution. The waveguide may include a body that longitudinally extends from a proximate end to a distal end. And the body may include a plurality of scattering flanges axially extending toward the proximate end on a first longitudinal side and a plurality of notches interposed between each of the plurality of scattering flanges.

BRIEF DESCRIPTION OF THE DRAWINGS

Preferred exemplary embodiments will hereinafter be described in conjunction with the appended drawings, wherein like designations denote like elements, and wherein.

DETAILED DESCRIPTION OF THE PREFERRED EMBODIMENTS

A waveguide (or light pipe or light-guide) is described below. The waveguide may be a molded or an extruded body having multiple cuts along one side to reflect and/or scatter light through the body to exit on an opposing side. More particularly, the waveguide may scatter a substantial portion or even a majority of the light backwardly or in a direction opposite its initial propagation (i.e., back toward a source connected to the waveguide). As will be described in greater detail below, waveguides having backward-scatter characteristics may be configured to illuminate predetermined, desired patterns or provide more uniform illumination (e.g., along the length of the waveguide).

Figure 1:
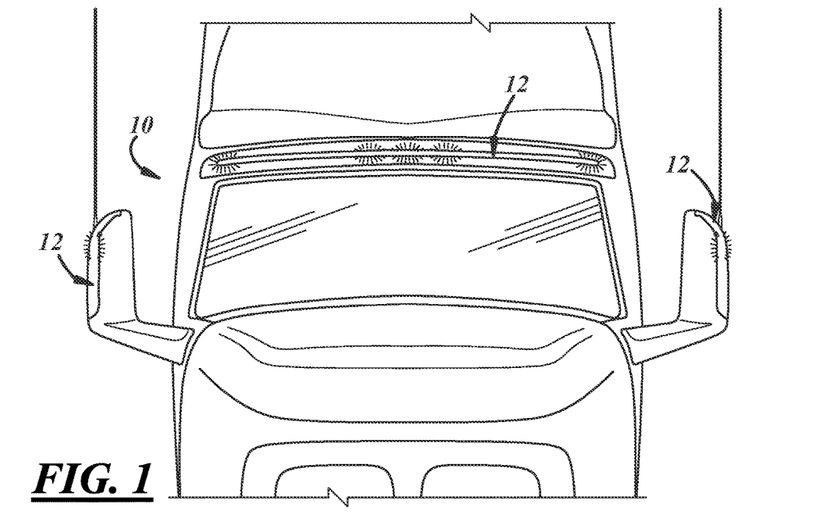
FIG. 1 is a front view of an exemplary environment of a waveguide.

FIG. 1 illustrates an exemplary environment. A front view of a vehicle 10 is shown having several waveguides 12—one waveguide is shown above a front windshield and two more waveguides are shown, one on each side mirror assembly. Waveguides may have a number automotive applications—e.g., in a vehicle interior and/or on a vehicle's exterior. The figures illustrate an automotive implementation; however, it will be appreciated that embodiments are not limited to an automotive environment or automotive applications. For example, waveguides 12 may be used in commercial and residential buildings or other architectural implementations, just to name a few other examples. And skilled artisans will appreciate additional implementations as well.

Figure 2:
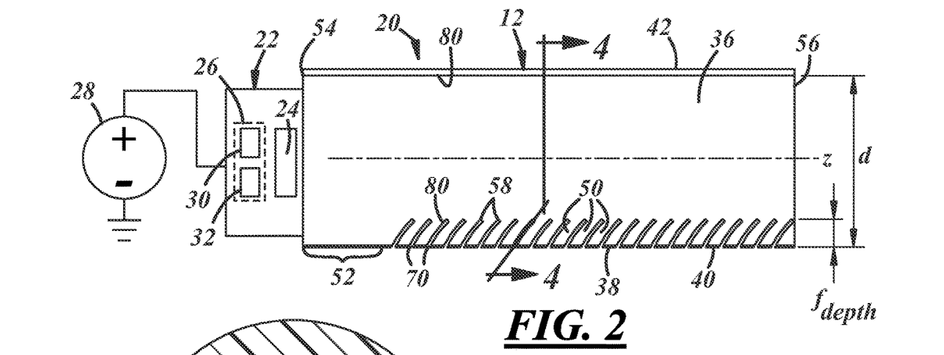
FIG. 2 illustrates a schematic view of a light engine and a side view of a waveguide.

FIG. 2 illustrates a schematic view of a waveguide assembly 20; i.e., a light engine 22 coupled to the waveguide 12. The light engine may comprise a light source 24 and a driver circuit 26 coupled to the source which may be electrically coupled to a power source 28. The driver circuit may include a processor 30, memory 32, or both and may be configured to illuminate the waveguide 12, as will be explained in greater detail below.

The waveguide 12 is shown having a longitudinally extending body 36 (along a z-axis). The body 36 may be solid or hollow; however, in at least one implementation, the body of the waveguide is solid. The body 36 may be comprised of any suitable material including acrylic, polycarbonate (PC), and various transparent plastics, just to name a few examples. In at least some implementations, a longitudinal side 38 (oriented as the bottom side in FIGS. 2 and 3) may have a reflective coating or layer 40 for directing rays out of an opposing side 42. And in other implementations, side 38 does not have layer 40. In at least one implementation, the opposing side 42 is flat or smooth; e.g., in one implementation, side 42 is parallel with the z-axis. In other implementations of the opposing side, side 42 is convex, concave, or has another suitable shape.

The waveguide 12 may have multiple scattering or reflecting flanges or fingers 50 on the longitudinal side 38 of the body 36. As will be described below, the fingers 50 may reflect and/or scatter light outwardly of the waveguide body 36. In some implementations, a portion 52 of the longitudinal side 38 may not have flanges (e.g., nearer a proximate end 54 of the body, nearer a distal end 56, or at other regions therebetween); however, this is merely an example.

The scattering flanges 50 may be flat or curved, extending both radially and axially toward the proximate end 54. As will be described below, in some embodiments, each flange 50 may have a similar angle of inclination ($\Theta$), have a similar linear length ($f_{linear}$), a similar axial length ($f_{length}$), a similar radial width ($f_{width}$), and a similar radial depth ($f_{depth}$) (see FIGS. 2-4). In embodiments where the flanges 50 are curved, the angle of inclination ($\Theta$) may be measured at a tangent along the curvature—as will be explained more below—in FIG. 3, it is shown measured from a radially-innermost region 58 of the flange with respect to the z-axis (or another longitudinal axis parallel thereto). As shown in FIG. 2, the radial depth ($f_{depth}$) may be a portion of an overall diameter (d) of the body 36. In some implementations, the radial depth ($f_{depth}$) is less than or equal to a third of the diameter (d). In another implementation, the radial depth ($f_{depth}$) is less than or equal to one-half of the diameter (d). Of course, these are just examples; other embodiments exist where the radial depth exceeds one-half of the waveguide. Skilled artisans will appreciate that flanges having greater radial depth ($f_{depth}$) may provide greater flexibility to the waveguide body 36 and that radial depths in excess of one half the diameter (d) may make the body unsuitably brittle. In addition, the radial depth ($f_{depth}$) of the flanges are one parameter that affect light distribution; therefore, depending on other factors (e.g., angle of inclination (Θ), shape of the waveguide body 36, etc.), it may be desirable to have deeper or shallower radial depths.

Scattering flanges 50 may have a first surface or side 60 (e.g., shown as a convex side) facing the proximate end 54 and a second surface or side 62 (e.g., shown as a concave side) facing the distal end 56 (see FIGS. 2, 3, 5, and 6). The sides 60, 62 may be defined by a peripheral edge 64 having a generally curved shape (e.g., having a vertex or apex 66 coincident with the longitudinal side 38). In at least one embodiment, the curved shape may be parabolic and may be common to all of the flanges 50. It should be appreciated that the longitudinal side 38 (defined by the peripheral edge 64) is illustrated and described with respect to a parabolic embodiment; however, other suitable shapes may be used as well including other curved-, flat-, or angular-shapes.

In addition, in other embodiments, the first side 60 is concave and the second side 62 is convex. In still other embodiments, one of the first or second sides 60, 62 has either a concave or a convex shape, while the other of the sides 60, 62 has a different shape (e.g., is flat, angled, or has some other feature). These are merely examples; other implementations are also possible.

Figure 3:
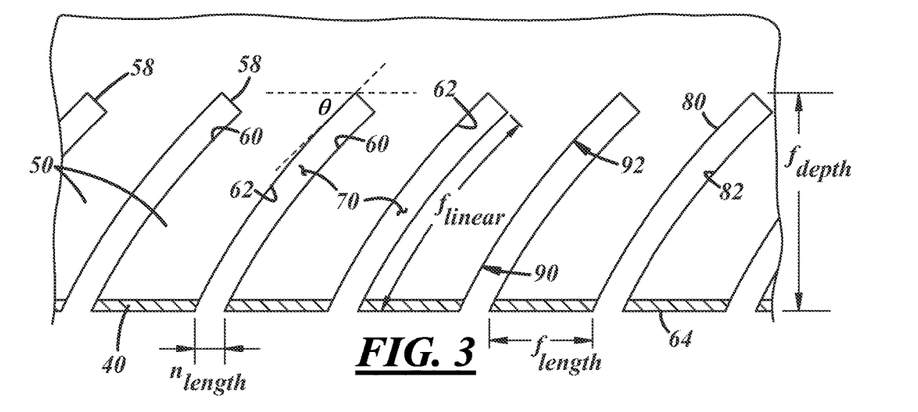
FIG. 3 is an enlarged view of a portion of FIG. 2 illustrating a plurality of scattering flanges of the waveguide.

Each of the scattering flanges 50 may be spaced from one another by a notch or gap 70 (see FIGS. 2, 3, 5, and 6). The notches 70 may define the shape of the adjacent flange(s) 50; in addition, in at least one embodiment, the notches 70 extend radially inwardly from the (lower) longitudinal side 38 and axially away from the proximate end 54 of the waveguide body 36. In the implementation described above, each of the notches 70 have a similar axial length ($n_{length}$) (FIG. 3). In some implementations, the axial length ($n_{length}$) of the notches 70 is substantially constant along the linear length of the notch (i.e., the side 62 of one flange is spaced evenly from the side 60 of a neighboring flange—e.g., regardless of whether the flanges 50 are straight or curved).

Other implementations exist where the spacing defining the notch 70 between the concave side 60 of the one flange is not spaced evenly from the convex side 62 of the neighboring flange as well. Regardless, the spacing defining the notches may or may not be uniform for a particular waveguide embodiment.

The waveguide 12 may be manufactured by any suitable process (e.g., molding, extrusion, etc.). However, according in at least one implementation, the body 36 of the waveguide is formed by an extrusion process. The reflective layer 40 (if applied) may be applied post-extrusion (e.g., by dipping or spraying the body 36). Or in some instances, the reflective layer 40 may be formed using a co-extrusion process where both the transparent materials and reflective materials are extruded simultaneously together. Thus, for example, the shape of an extrusion tool may define the curved or parabolic shape of the longitudinal side 38. After the body 36 of the waveguide 12 has cured or sufficiently hardened, the notches 70 may be cut into the longitudinal side 38 forming or defining the shape of the scattering flanges 50 and defining the axial lengths ($f_{length}$) and notch lengths ($n_{length}$) therebetween. According to one embodiment, the notches 70 are cut using a laser and the axial length ($n_{length}$) of the notches is defined by the width of the laser. According to another manufacturing embodiment, the waveguide 12 may be formed in a mold—the mold having features to define the shape and size of the flanges 50.

In some embodiments of the waveguide 12, the diameter (d) of the body 36 may be between 25-100 millimeters (mm); and in at least one embodiment, the diameter (d) may be approximately 3.0-10.0 mm. In some embodiments of the waveguide, the radial depth ($f_{depth}$) of the flanges 50 may be between 8.3-33 mm; and in at least one embodiment, the radial depth ($f_{depth}$) may be approximately 0.3-5.0 mm. In some embodiments of the waveguide, the axial length ($n_{length}$) of the notches 70 may be 0.1-1.0 mm; and in least one embodiment, the axial length ($n_{length}$) is approximately 0.2 mm. It will be appreciated by skilled artisans that minimizing the axial length ($n_{length}$), and consequently the air gap between the flanges 50, is desirable. In addition, in some embodiments of the waveguide 12, the angle of inclination (Θ) may be between 20 and 70 degrees) (°).

Other embodiments of the waveguide also exist. For example, two or more of the scattering flanges 50 may have differing axial lengths ($f_{length}$). Described differently, the notches 70 between the flanges 50 may not be uniformly distributed along the length of the waveguide 12. The frequency of the notches (e.g., for a given length of the waveguide body) may provide more or less scattered light according to a predetermined or desired pattern. For example, in at least one embodiment, a more uniform light distribution is provided along the length of the waveguide 12 where the frequency of the notches 70 gradually or progressively increases from the proximate end 54 to the distal end 56. Or in another example, a non-uniform light distribution pattern may be provided by clustering multiple notches 70 closer to one another along the waveguide length (e.g., occurring a higher frequency for at least a portion of the length) and by spacing at least some notches 70 farther from one another along a different portion of the waveguide length.

Another embodiment may provide predetermined light distribution patterns or uniformity as well by differing the radial depth ($f_{depth}$) of the scattering flanges 50. Consequently, this also differs the linear length ($f_{linear}$) of the flanges. For example, a uniform distribution may be provided by gradually or progressively providing deeper cuts from the proximate end 54 to the distal end 56 (e.g., shallower cuts at the proximate end 54 and deeper cuts at the distal end 56) while providing scattering flanges 50 of similar axial lengths ($f_{length}$); i.e., a uniform notch arrangement. And similarly, a non-uniform distribution may be provided having uniform notch distribution by clustering along the length of the waveguide some of the notches 70 having generally deeper cuts and clustering some of the notches having generally shallower cuts.

In one embodiment, the notches may be differently spaced from one another to provide a uniform light distribution from the waveguide where a single light source (e.g., 24) is located at the proximate end 54. This uniform distribution accounts for an exponential loss of light intensity by a predetermined amount at each flange 50 (e.g., approximately 5%). Thus in this embodiment, the spacing of the notches 70 may be defined by a relationship between the axial length ($f_{length}$) of 1 f each consecutive flange 50 and an ordinal number ($n_1$, $n_2$, $n_3$, . . . ) associated with each consecutive notch 70 measured from the proximate end 54 of the waveguide body 36, where $n_1=1$, $n_2=2$, $n_3=3$, etc. For example, if each of the notches 70 were consecutively numbered beginning with the notch closest to the proximate end 54, the ordinal numbers would be $n_1$ (the first notch 70), $n_2$ (the second notch 70), $n_3$ (the third notch 70), etc. The axial length ($f_{length}$) of any flange is determinable by the following relationship: axial length $(f_{length})=e\hat{\,}(-n*\beta)$, where $\beta$ is an attenuation coefficient ($\beta$) (e.g., 5% or 0.05). Thus, for example, the axial length ($f_{length}$) of the fourth flange 50 would equal $e\hat{\,}(-n_4*\beta)$. Using this relationship, the a waveguide of any length having any number of flanges 50 and notches 70 may be provided that produces a uniform light distribution.

Of course in some implementations, the axial lengths ($f_{length}$) of at least some of the flanges 50 and the radial depths ($f_{depth}$) of at least some of the flanges 50 both may be varied to produce a multitude of different patterns and light distributions.

An example of a desirable illumination pattern may include patterns required on some commercial vehicles (such as vehicle 10). For example, on vehicles having a width greater than 80 inches, five lamps may be required according to government regulation—e.g., three identification lamps nearer the centerline of the vehicle 10 over the windshield and two clearance lamps spaced from the three lamps nearer the driver and passenger side doors. An example of such an arrangement is shown in FIG. 1. Between the five lamps, regions of lesser illumination may exist to add decorative or aesthetic qualities. This arrangement may be implemented using a single light engine and a single waveguide (such as engine 22 and waveguide 12). The scattering flanges 50 of the waveguide 12 may be configured to adequately scatter more light in the five regions corresponding to the government regulated lamps. In addition, the scattering flanges may be configured so that the aesthetic regions therebetween have a generally uniform appearance. Of course, this is merely an example. Other arrangements are also possible.

Figure 4:
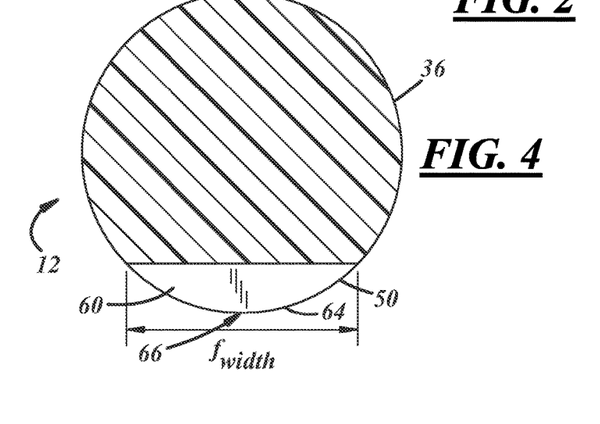
FIG. 4 is a cross-sectional view of the waveguide of FIG. 2 along section lines 4-4.
Figure 5:
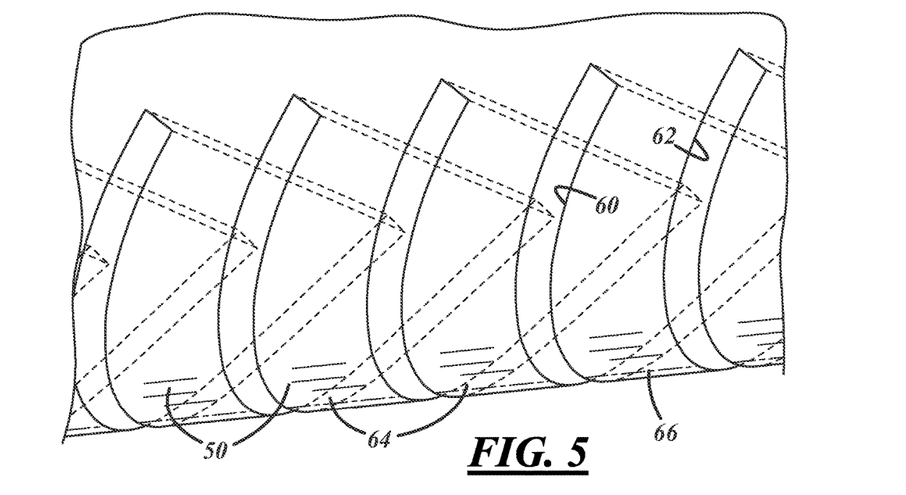
FIG. 5 is a perspective view of the scattering flanges shown in FIG. 2.

In other embodiments, the cross-sectional shape of the waveguide may differ. For example, FIG. 4 illustrates a circular cross-sectional shape; however, other shapes including an oval, a mushroom, etc. are possible.

During operation of the waveguide assembly 20, the powered light engine 22 may provide light to the waveguide 12 via the light source 24. The light may be received via the proximate end 54 of the waveguide body 36 initially propagating in the direction of the distal end 56. The light rays 78 may reflect off of inner surface(s) 80 of the waveguide or off of outer surface(s) 82 of the waveguide (see e.g., FIG. 7). Some of these light rays 78 may exit the waveguide (e.g. pass through the flanges) and then re-enter a nearby flange 50 at an altered angle based on the differences between the indices of refraction of two mediums (e.g., air and plastic, or air and glass, just to name a couple examples). In one example, a light ray 78 may reflect off of a portion of the inner surface 80 that is coincident with the flange surface 62 and then be directed radially outwardly through the (upper) longitudinal side 42. In addition, the reflected light ray 78 may scatter at the surface 80—diverging as it exits waveguide side 42. Based on the angle of inclination ($\Theta$) of the flange surface 62, more of the light rays striking the surface 80 may be reflected in the rearward direction (toward the proximate end 54) than in the forward direction (toward the distal end 56). The scattering (or back scattering) effect of the light rays 78 as they reflect off of the surface 80 may further contribute the majority of the light rays 78 being directed towards the proximate end 54. And in some embodiments, the curvature of the flanges 50 may be configured to scatter the light rays 78 to provide a desirable uniformity or pattern.

Figure 7:
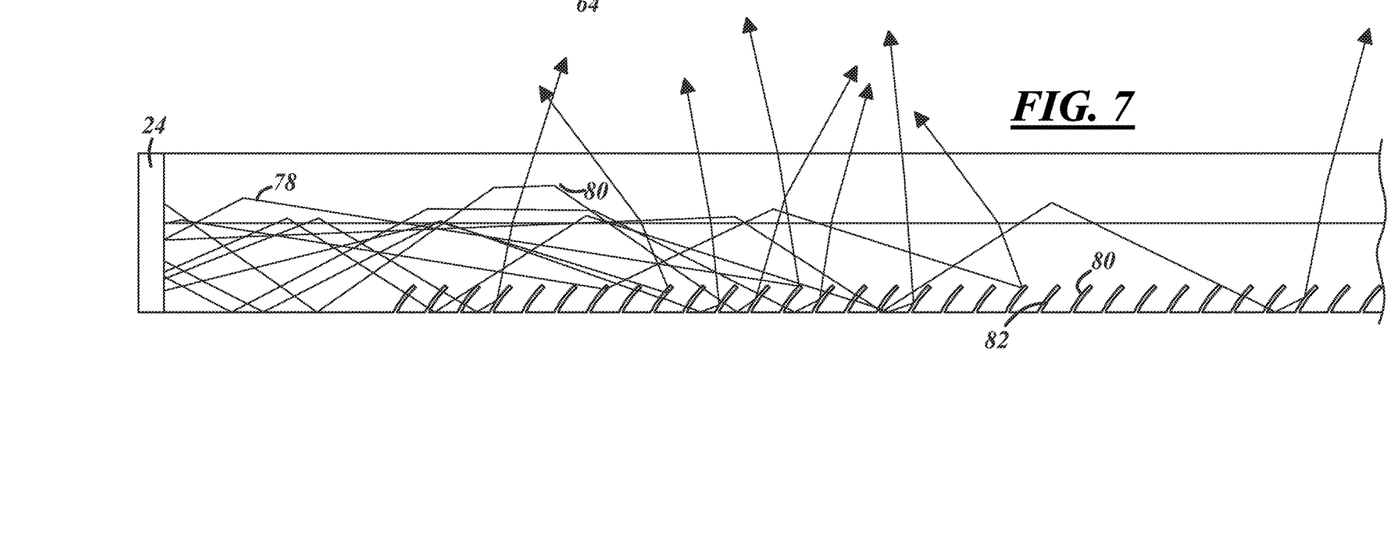
FIG. 7 is a diagram showing light-rays traced through the waveguide.

FIG. 7 illustrates ten light-rays transmitted into the proximate end 54 of the waveguide 12 as modeled using a ray-tracing software (e.g., SPEOS™). The light-rays 78 are traced to demonstrate that the configuration of the scattering flanges 50 results in more than 50% of the light rays 78 being reflected and/or scattered in a rearward direction; i.e., in a direction opposite the direction of initial propagation. More specifically, six of the ten rays 78 are directed at least partially toward the proximate end 54, and the remaining four rays are directed at least partially toward the distal end 56. Skilled artisans will appreciate that more light rays may pass through the waveguide 12, and that only ten rays are shown to illustrate the waveguide performance.

Figure 8:
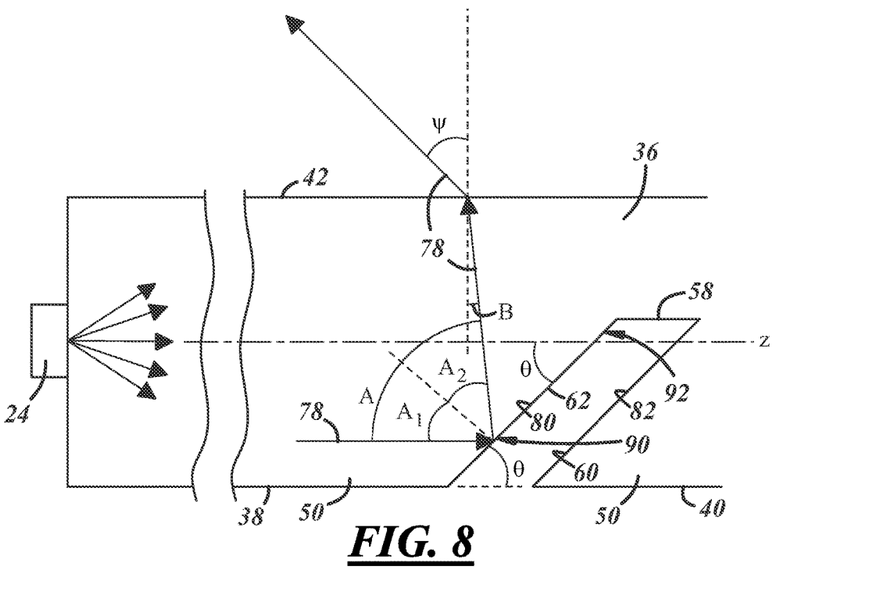
FIGS. 8 and 9 are schematic diagrams illustrating reflectance and scattering from one of the scattering flanges shown in FIG. 2.
Figure 9:
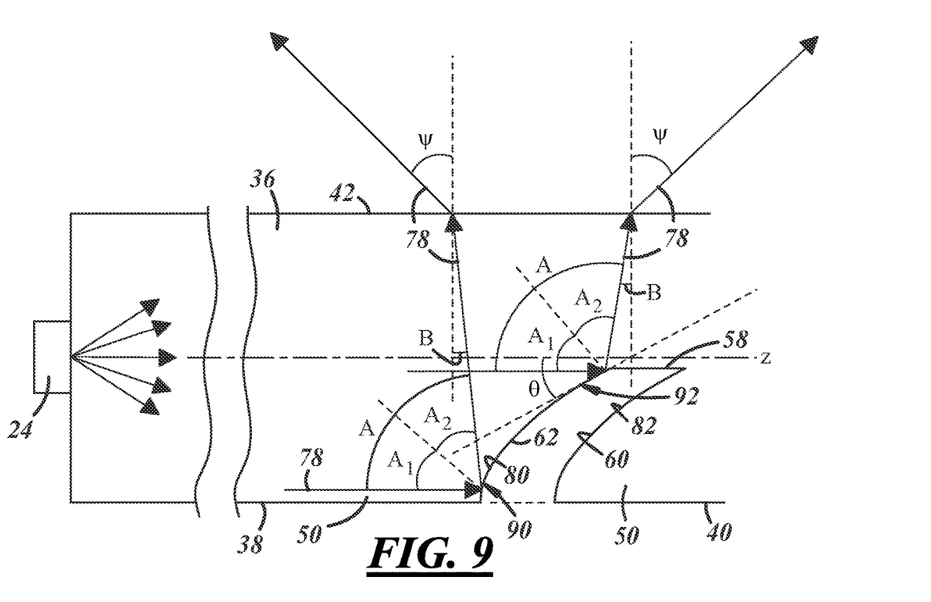

FIGS. 8 and 9 illustrate reflectance and/or scattering from one of the scattering flanges 50. The primary difference between FIGS. 8 and 9 is that FIG. 8 illustrates the notch 70 between the flanges 50 as being straight, whereas FIG. 9 illustrates the notch 70 between the flanges 50 as being curved. Thus, the angle of inclination ($\Theta$) in FIG. 8 (showing a straight flange 50) may be constant between a distal region 90 of the flange and a proximate region 92 thereof. However, in FIG. 9 (showing a curved flange 50), the angle of inclination ($\Theta$) changes with the curvature of the flange between the distal and proximate regions 90, 92. That is, in FIG. 9, the angle of inclination ($\Theta$) is the angle formed by a tangent to the curvature of side 62 and the z-axis. In both FIGS. 8 and 9, light ray(s) are shown reflecting off the inner surface 80 of the flange 50 and being ultimately directed outwardly of the waveguide body 36 (at the longitudinal side 42).

FIGS. 8 and 9 also show a number of angles: an angle A (comprised of angles A1 and A2), an angle B, and an exit angle psi ($\Psi$), as well as the afore-mentioned angle of inclination ($\Theta$). Exit angle psi ($\Psi$) is an angle measured relative to a normal of longitudinal side 42, and according to one embodiment, angle psi ($\Psi$) or a range of angles psi ($\Psi$) may be selectable based on the value(s) of inclination $\Theta$. Namely, $\Psi=\sin^{-1}[x*\sin(90-2*\Theta)]$, where x is the index of refraction associated with the body 36 of the waveguide 12 and air is the second medium (and where $\Psi$, $\Theta$, and 90 have units of degrees). Angles A and B are calculable based on the value of the angle of inclination ($\Theta$); namely, angle A=A1+A2, where A1=A2=(90−$\Theta$), and angle B=(90−2*$\Theta$). Thus, the desired range of values of psi ($\Psi$) can be determined by determining the value(s) of inclination ($\Theta$), where the desired range will coincide with a desired spread or distribution of light from the longitudinal side 42.

It will be observed from FIG. 9 that two light rays are shown reflecting off of the inner surface 80 and exiting the body 36—one within the distal region 90 of the flange 50 and the other at the proximate region 92 of the flange. It will be observed that the different values of $\Theta$ result in light rays projecting forwardly or rearwardly, with respect to the light source. It will further be observed that, in at least one embodiment, by controlling the curvature of the sides (e.g., 60, 62), the majority of the light rays may be directed in more of a rearwardly direction. This is particularly true when the curvature of the flange 50 approximates a parabola (as shown in FIGS. 2, 3, and 9).

Further, it should be appreciated that light reflecting off of the inner surface 80 exiting the body 36 may also diverge or scatter. The contribution of this scattering effect may further contribute to the majority of the light being directed in the rearwardly direction.

Figure 10:
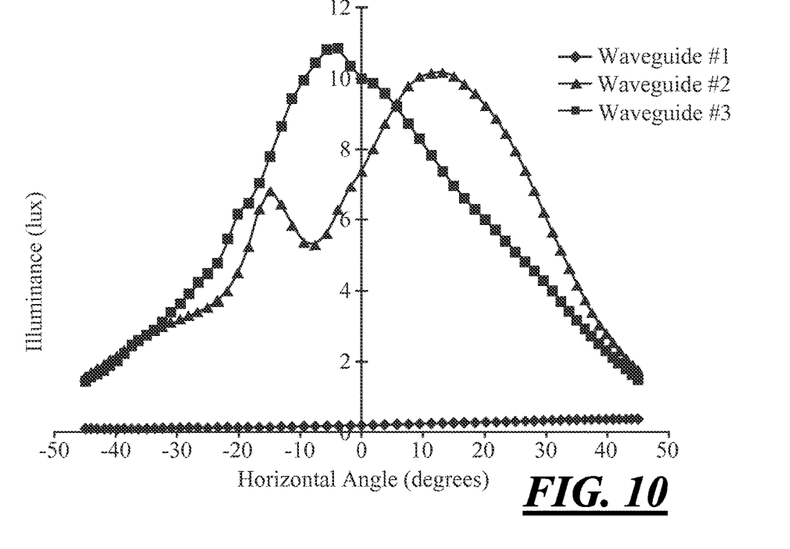
FIG. 10 is a two-dimensional (2-D) depiction of the performance characteristics of three different types of waveguides.
Figure 11:
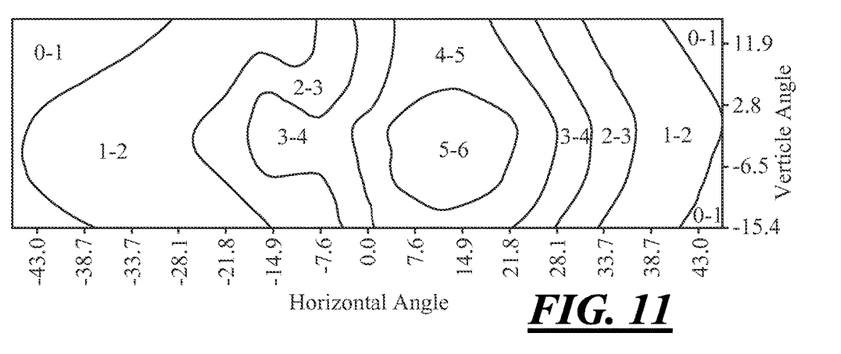
FIG. 11 is a three-dimensional (3-D) depiction of the performance characteristics of one of the waveguides of FIG. 8.
Figure 12:
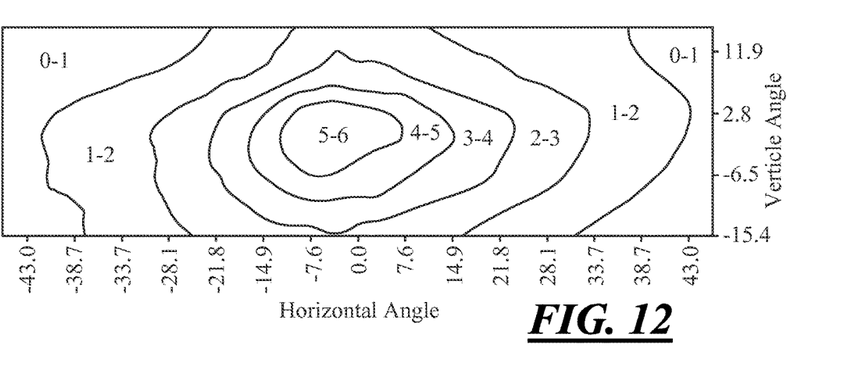
FIG. 12 is a three-dimensional (3-D) depiction of the performance characteristics of another one of the waveguides of FIG. 8.

FIGS. 10-12 illustrate the performance of one embodiment of the waveguide 12 described herein. FIG. 10 shows a performance comparison chart made using test devices: waveguide#1, waveguide#2, and waveguide#3. The independent axis shows the directivity of reflections and/or scattering of propagated light in the waveguide 12 (e.g., in the rearward and forward directions) (i.e., spanning from −50° to +50°, where 0° is a direction normal to the longitudinal side 42). The dependent axis illustrates the relative intensity or magnitude of illuminance (lux). Waveguide#1 was a waveguide having a rough or uneven surface on the (lower) longitudinal side 38 of the body 36 to scatter light; this rough surface did not include flanges. Waveguide#2 had flanges 50 as described above that were flat or straight. And waveguide#3 had flanges 50 that were curved (e.g., having convex and concave sides 60, 62 as described above). According to the chart data and relatively speaking, waveguide#1 exhibits no appreciable scattering in the rearward direction; moreover, scattering in the forward and rearward directions is substantially less than that of waveguide#2 and #3. Waveguide#2 exhibits significant scattering at two peaks: at approximately −16° (the rearward direction) and +12° (the forward direction). And waveguide#3 peaks in the rearward direction at approximately −5° having the largest peak of the three test devices.

FIGS. 11 and 12 illustrate some of the same subject matter shown in FIG. 10; however, in FIGS. 11 and 12, the data is presented in a three-dimensional (3-D) format (the relative magnitudes measured in Candela (cd); e.g., 0-1 cd, 1-2 cd, . . . , 5-6 cd). Thus, FIG. 11 illustrates the two peaks at −16° and +12° which are described above. And FIG. 12 illustrates the single peak at approximately −5°.

Figure 6:
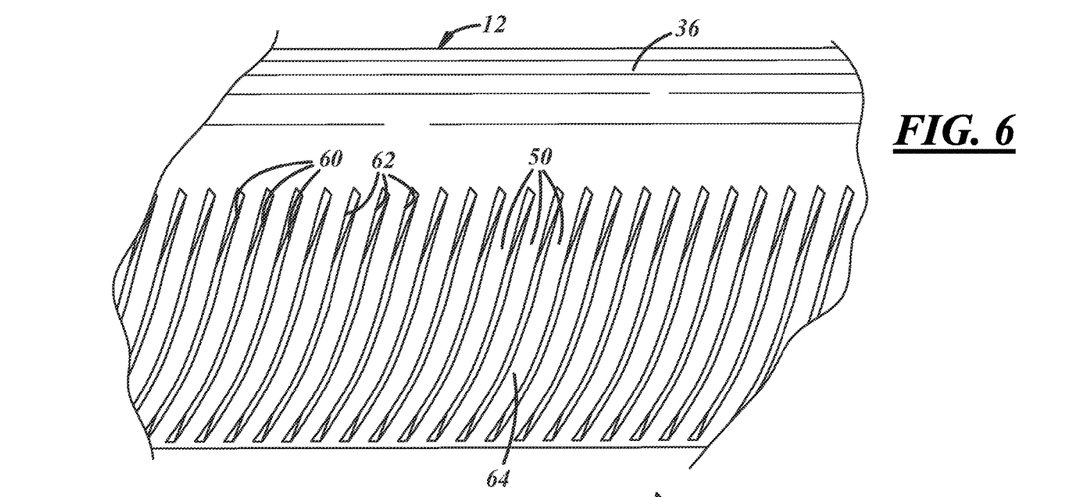
FIG. 6 is a partial perspective bottom view of the waveguide of FIG. 2.

Thus, FIGS. 10-12 illustrate rearward reflections and/or scattering with waveguides having flanges 50. In addition, curved flanges such as those shown in FIGS. 2, 3, and 6 provide the greatest illuminance in the rearward direction.

Thus, there has been described a waveguide that is couplable to a light engine. The waveguide has multiple flanges on one longitudinal side that may be flat or curved. In addition, the dimensions and orientation of the flanges may be suitably configured to reflect and/or scatter a substantial amount of light projected into the waveguide by the light engine in a backwards direction; i.e., in a direction opposite of its initial propagation. The flanges may preconfigured to provide regions of uniform light distribution or any suitable light distribution pattern.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A waveguide for controlled light distribution, comprising:
an axially extending body that conducts light and includes:
a proximate end that receives light from a light engine;
a distal end that is opposite the proximate end;
a first longitudinal side that extends between the proximate and distal ends;
a second longitudinal side that is opposite the first longitudinal side and also extends between the proximate and distal ends;
a plurality of notches that are formed in the first longitudinal side so as to extend from an outer surface of the axially extending body into an interior of the axially extending body in a curved manner; and
a plurality of scattering flanges interspersedly formed between the plurality of notches and configured for directing light out of the axially extending body at the second longitudinal side, wherein each of the scattering flanges has a first curved side facing the proximate end and a second curved side facing the distal end and each of the plurality of notches is a curved slit with a uniform axial length ($n_{length}$) along an extent of each notch, wherein the axial length ($n_{length}$) of each notch of the plurality of notches is uniform from the first longitudinal side to a radially innermost region, wherein each notch is curved away from the light engine such the radially innermost region is closer to the distal end than the curved slit at the first longitudinal side, wherein the plurality of scattering flanges is configured to scatter a majority of the light in a direction away from a direction of initial propagation of the light from the light engine.

2. The waveguide of claim 1, wherein a peripheral edge of each of the plurality of scattering flanges has a curved shape.

3. The waveguide of claim 1, wherein the plurality of notches are evenly spaced from one another along at least a portion of the length of the waveguide.

4. The waveguide of claim 1, wherein some of the plurality of notches which are closer to the proximate end are spaced farther from one another than some of the plurality of notches which are closer to the distal end.

5. The waveguide of claim 1, wherein the some of the plurality of notches which are closer to the proximate end are shallower than the some of the plurality of notches which are closer to the distal end.

6. The waveguide of claim 1, wherein the plurality of notches extend radially and axially from the axially extending body at a uniform angle of inclination ($\Theta$).

7. A waveguide assembly comprising the waveguide of claim 1, the light engine comprising:
a light source; and
a driver circuit coupled to the light source.

8. The waveguide assembly of claim 7, wherein at least one of the plurality of scattering flanges is positioned at an angle of orientation ($\Theta$) with respect to the proximate end, wherein more light received from the light source is reflected off the at least one of the plurality of scattering flanges, scattered by the at least one of the plurality of scattering flanges, or both in a first direction that is toward the proximate end of the axially extending body than is reflected off the at least one of the plurality of scattering flanges, scattered by the at least one of the plurality of scattering flanges, or both in a second direction toward the distal end of the axially extending body.

9. A waveguide for controlled light distribution, comprising
an axially extending body that includes:
a proximate end that receives light from a light engine;
a distal end that is opposite the proximate end; and
a first longitudinal side that extends between the proximate and distal ends;
a second longitudinal side that is opposite the first longitudinal side and also extends between the proximate and distal ends;
a plurality of laser cut notches that are formed in the first longitudinal side so as to extend from an outer surface of the axially extending body into an interior of the axially extending body in a manner that is both radially inward and axially toward the distal end; and
a plurality of fingers interspersedly formed between the plurality of laser cut notches and configured for directing light out of the axially extending body at the second longitudinal side,
wherein each of the plurality of laser cut notches is a slit with a uniform axial length ($n_{length}$) corresponding to a width of the laser used to cut the notch, wherein a cross-sectional shape and orientation of each finger of the plurality of fingers is the same as a cross-sectional shape and orientation of each laser cut notch of the plurality of laser cut notches, wherein the axial length ($n_{length}$) of each laser cut notch of the plurality of laser cut notches is less than an axial length ($f_{length}$) of each finger of the plurality of fingers, wherein at least some of the plurality of fingers have the same axial length ($f_{length}$), and wherein the plurality of fingers is configured to scatter a majority of the light in a direction away from a direction of initial propagation of the light from the light engine.

10. A waveguide for controlled light distribution, comprising:
an axially extending body that conducts light and includes:
a proximate end that receives light from a light engine;
a distal end that is opposite the proximate end;
a first longitudinal side that extends between the proximate and distal ends;
a second longitudinal side that is opposite the first longitudinal side and also extends between the proximate and distal ends;
a plurality of notches that are formed in the first longitudinal side so as to extend from an outer surface of the axially extending body into an interior of the axially extending body in a curved manner; and
a plurality of scattering flanges interspersedly formed between the plurality of notches and configured for directing light out of the axially extending body at the second longitudinal side, wherein each of the scattering flanges has a first curved side that is convex and faces the proximate end and a second curved side that is concave and faces the distal end and each of the plurality of notches is a curved slit with a uniform axial length ($n_{length}$), wherein the first curved side and the second curved side are curved in a same direction away from received light from the light engine, and wherein the plurality of fingers is configured to scatter a majority of the light in a direction away from a direction of initial propagation of the light from the light engine.

* * * * *

UNITED STATES PATENT AND TRADEMARK OFFICE
CERTIFICATE OF CORRECTION

PATENT NO. : 10,330,845 B2
APPLICATION NO. : 14/495867
DATED : June 25, 2019
INVENTOR(S) : Todd Irgang et al.

Page 1 of 1

It is certified that error appears in the above-identified patent and that said Letters Patent is hereby corrected as shown below:

In the Specification

Column 4, Line 65 replace "......of 1 f each consecutive flange 50...." to read "......of each consecutive flange 50...."

Signed and Sealed this
Twenty-first Day of January, 2020

Andrei Iancu
*Director of the United States Patent and Trademark Office*